United States Patent [19]
Manske

[11] Patent Number: 5,307,232
[45] Date of Patent: Apr. 26, 1994

[54] FAST RESET DEGAUSSING SYSTEM
[75] Inventor: Hans E. Manske, Addison, Ill.
[73] Assignee: Zenith Electronics Corp., Glenview, Ill.
[21] Appl. No.: 871,452
[22] Filed: Apr. 21, 1992
[51] Int. Cl.⁵ .............................................. H04N 9/29
[52] U.S. Cl. ......................................... 361/150; 315/8
[58] Field of Search .................... 361/150, 151; 315/8, 315/364

[56]  References Cited
U.S. PATENT DOCUMENTS
4,760,489  7/1988  Truskalo .............................. 361/150
4,829,214  5/1989  Lendaro .................................. 315/8

FOREIGN PATENT DOCUMENTS
0052982  3/1984  Japan ................................... 361/150
0192483  9/1985  Japan ................................... 361/150

Primary Examiner—Jeffrey A. Gaffin

[57] ABSTRACT

A fast reset degaussing system includes a full wave rectifier bridge having a degaussing coil coupled in series therewith to a source of operating AC power. A variable current element is provided by a field effect transistor which produces a variable load upon the full wave rectifier bridge. An RC charging circuit is coupled to the control electrode of the field effect transistor to cause an exponentially decaying current within the transistor and thereby impose an exponentially load upon the full wave rectifier bridge. The degaussing coil current responds directly to the load imposed upon the rectifier bridge by the field effect transistor and produces an exponentially decaying alternating current suitable for cathode ray tube degaussing.

11 Claims, 3 Drawing Sheets

FAST RESET DEGAUSSING SYSTEM

FIELD OF THE INVENTION

This invention relates generally to cathode ray tubes and particularly to degaussing systems used therein.

BACKGROUND OF THE INVENTION

The color cathode ray tube used in television receivers and computer monitors provides excellent brightness, resolution and color display characteristics. While several variations of cathode ray tube structures have been developed through the years, most generally include a high strength funnel-like glass envelope having a faceplate which is either slightly convex or flat. The glass envelope further includes a rearwardly extending elongated neck within which a plurality of electron gun assemblies are supported. A pattern of phosphor deposits are formed on the inner surface of the faceplate and arranged in repeated patterns. Each phosphor type is characterized by the emission of a single color wavelength of light when struck by high energy electrons. In most cathode ray tubes, a selection electrode is interposed between the electron gun assembly and the phosphor screen of the faceplate. The selection electrode which typically comprises either a foraminous shadow mask or flat tension mask cooperates with the electron gun assembly in assuring that the electrons emanating from each electron gun toward the faceplate strike their respective phosphor deposits and avoid striking the phosphor deposits of each of the other two electron guns.

The cathode ray tube display is operated by imposing horizontal and vertical scan magnetic fields upon the electron beams causing the phosphor screen to be periodically scanned. The horizontal scanning system also produces the required high voltage electron beam accelerating potential which imparts sufficient energy to the electrons striking the phosphors of the faceplate to cause the desired light output. The control of the three electron guns to properly maintain and direct the electrons beams and their viewing screen impacts is a matter of considerable precision and is aided by supplemental magnetic fields applied to the electron beams for purposes of geometric correction and convergence correction.

Because the electron beam precision is extremely susceptible to the influence of magnetic fields, the metal components both within and proximate to the exterior of the cathode ray must be periodically degaussed to remove accumulated magnetism thereof. Such metal components are often subjected to unintentional or undesired magnetism due to the operation of appliances, tools and other sources of magnetic influence. The system is sufficiently delicate that the earth's magnetic field itself may cause undesired magnetism of sufficient strength to upset the CRT precision.

The high susceptibility of color cathode ray tubes to such magnetic influence has prompted practitioners in the art to employ various degaussing systems in the operation of color television receivers and color computer monitors. The most common degaussing system utilized an alternating current magnetic field of diminishing amplitude usually triggered for operation when the receiver or computer monitor is initially turned on. Perhaps the most common degaussing system provides one or more degaussing coils supported near the critical portions of the cathode ray which are energized by a diminishing amplitude alternating current usually derived from the receiver or monitor power supply. Most degaussing systems employ one or more thermally responsive devices such as thermistors to cause the required amplitude decay of degaussing current. While thermally responsive degaussing circuits are acceptable for many uses, they are subject to a cooling interval requirement between cycles. Thus, television receivers and computer monitors which are frequently turned on and off may receive little, if any, degaussing action during such use due to the lack of sufficient cooling intervals to permit the thermally responsive devices to cool down.

Accordingly, it is a general object of the present invention to provide an improved degaussing system. It is a more particular object of the present invention to provide an improved degaussing system which may be rapidly reset for successive operational cycles.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
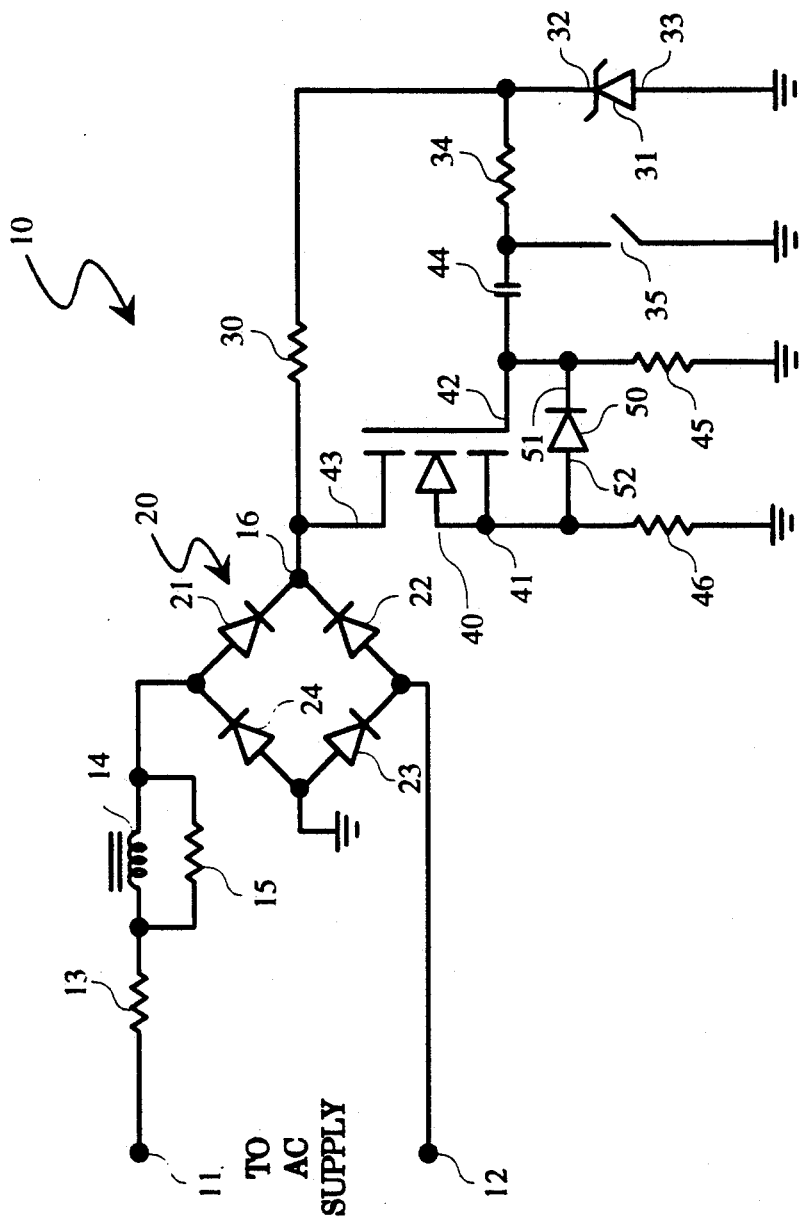
FIG. 1 sets forth a schematic diagram of a fast reset degaussing system constructed in accordance with the present invention.

FIG. 1 sets forth a schematic diagram of a fast reset degaussing system constructed in accordance with the present invention and generally referenced by numeral 10. Degaussing system 10 includes a pair of connections 11 and 12 which are coupled to the high and low sides respectively of a conventional alternating current power source (not shown). As is set forth below in greater detail, degaussing system 10 is operable is responsive to either one hundred and twenty volts or two hundred and twenty volts power sources operating at either sixty or fifty hertz. Power connection 11 is coupled to a degaussing coil 14 by a current limiting resistor 13. Coil 14 comprises a conventional degaussing coil positioned upon or proximate to the cathode ray tube in accordance with conventional fabrication techniques. A damping resistor 15 is coupled in parallel with degaussing coil 14. A quartet of diodes 21, 22, 23 and 24 are arranged in a conventional full wave rectifier bridge generally referenced by numeral 20. The junction of diodes 23 and 24 is coupled to ground while the junction of diodes 21 and 24 is coupled to degaussing coil 14 and resistor 15. The junction of diodes 22 and 23 is coupled to power coupling connection 12. Finally, the junction of diodes 21 and 22 forms the positive output of bridge rectifier circuit 20.

A zener diode 31 includes a cathode 32 coupled to the junction of diodes 21 and 22 by a resistor 30 and an anode 33 coupled to ground. A field effect transistor 40 includes a source electrode 41 coupled to ground by a source resistor 46, a gate electrode 42 coupled to ground by a resistor 45, and a drain electrode 43 coupled to the junction of diodes 21 and 22. A diode 50 includes a cathode 51 coupled to gate 42 and an anode 52 coupled to source electrode 41. A capacitor 44 and a resistor 34 are series coupled between gate electrode 42 of field effect transistor 40 and cathode 32 of zener diode 31. A switch 35 is coupled between the junction of capacitor 44 and resistor 34 and ground. Switch 35 is operatively coupled to the on/off switch (not shown) of the host television receiver or computer monitor display system within which degaussing system 1 is utilized. The important characteristic of switch 35 is its operational relationship to the receiver or monitor on/off switch such that switch 35 is closed when the host receiver or monitor is off and is open when the host receiver or monitor is turned on.

In operation with the host receiver initially turned off, switch 35 is closed. With switch 35 closed, capacitor 44 is discharged and gate 42 of field effect transistor 40 is at or near ground potential. As a result, with a ground potential upon gate 42, field effect transistor 40 is nonconducting.

The application of conventional AC power to connections 11 and 12 produces an alternating current flow through resistor, 13, coil 14 and full wave rectifier bridge 20. Rectifier bridge circuit 20 operates in accordance with conventional full wave bridge rectifying techniques to produce a full wave rectified positive voltage at the junction of diodes 21 and 22.

With gate 42 at ground due to the closure of switch 35 and the resulting nonconduction of field effect transistor 40, the positive voltage at output node 16 of bridge 20 produces a current flow through resistors 30 and 34 and switch 35. The load imposed upon full wave bridge circuit 20 by the current flow through resistors 30 and 34 causes a small alternating current to flow through degaussing coil 14.

This condition described above continues so long as the host receiver remains turned off and as a consequence switch 35 remains closed. Once the host receiver is turned on, however, and switch 35 is opened, the rectified voltage at output node 16 of bridge circuit 20 produces a charging current through resistors 30 and 34, capacitor 44 and resistor 45 which causes capacitor 44 to become charged. The charging current operative upon capacitor 44 is initially high and diminishes as capacitor 44 becomes charged. Thus, the charging current flowing through capacitor 44 and resistor 45 assumes the exponential characteristic by curve 62 in FIG. 3. The charging current of capacitor 44 through resistor 45 produces a corresponding voltage at gate 42 of field effect transistor 40. With the initial high gate voltage applied to field effect transistor 40, transistor 40 becomes conductive causing current to additionally flow from output node 16 through the drain to source path of field effect transistor 40. With temporary reference to FIG. 3, curve 63 shows the drain current of field effect transistor 40 while curve 64 shows the drain voltage produced thereby. As can be seen, the drain current of field effect transistor 40 essentially follows the voltage at gate 42. Thus, as capacitor 44 becomes charged and the voltage at gate 42 decays exponentially in accordance with curve 62, the drain current of field effect transistor 40 undergoes a corresponding exponential decay.

Because the current through degaussing coil 14 is determined by the load imposed upon full wave rectifier bridge circuit 20, the change of conduction of field effect transistor 40 and the increased current carried thereby cause a corresponding increase in the current through degaussing coil 40. With temporary reference to FIG. 3, the current carried by degaussing coil 14 is shown by alternating wave form 65. It should be noted that the envelope 66 of wave form 65 displays an exponential decay characteristic corresponding to the conduction of field effect transistor 40. Thus, as field effect transistor 40 initially conducts at a high rate due to the gate voltage at gate 42, a correspondingly high current is carried by degaussing coil 14. As the voltage at gate 42 decays due to the charging of capacitor 44, the drain current of field effect transistor 40 undergoes a corresponding exponential decay. The decay of current carried by field effect transistor 40 produces a corresponding exponential decay of the alternating current carried by degaussing coil 14. This exponential decay continues until the point at which capacitor 44 becomes fully charged (shown as dashed line 61 in FIG. 3) and degaussing circuit 10 stabilizes with little or no current flowing through degaussing coil 14.

Once the host receiver is again turned off, switch 35 is again closed and capacitor 44 is discharged returning degaussing circuit to its initial condition described above from which the degaussing action is again initiated when the host receiver is again turned on and switch 35 is again opened. It should be noted that the rate of decay of degaussing current through degaussing coil 14 is controllable by establishing the desired time constant within the charging path of capacitor 44. Thus, the size of capacitor 4 together with the resistances of resistors 30, 34 and 45 may be selected to produce the desired time constant decay for the circuit degaussing action. It should be noted that the circuit of FIG. 1 is free of thermally responsive elements and thus is quickly reset each time switch 35 is closed. As a result, the resetting time of the circuit of FIG. 1 is limited solely by the time constant provided by capacitor 44 and resistor 45 as capacitor 44 is discharged. It has been found that capacitor 44 and resistor 45 ma easily be selected to provide a reset time which is virtually instantaneous in comparison with the reset times encountered by thermally responsive prior art devices.

Figure 2:
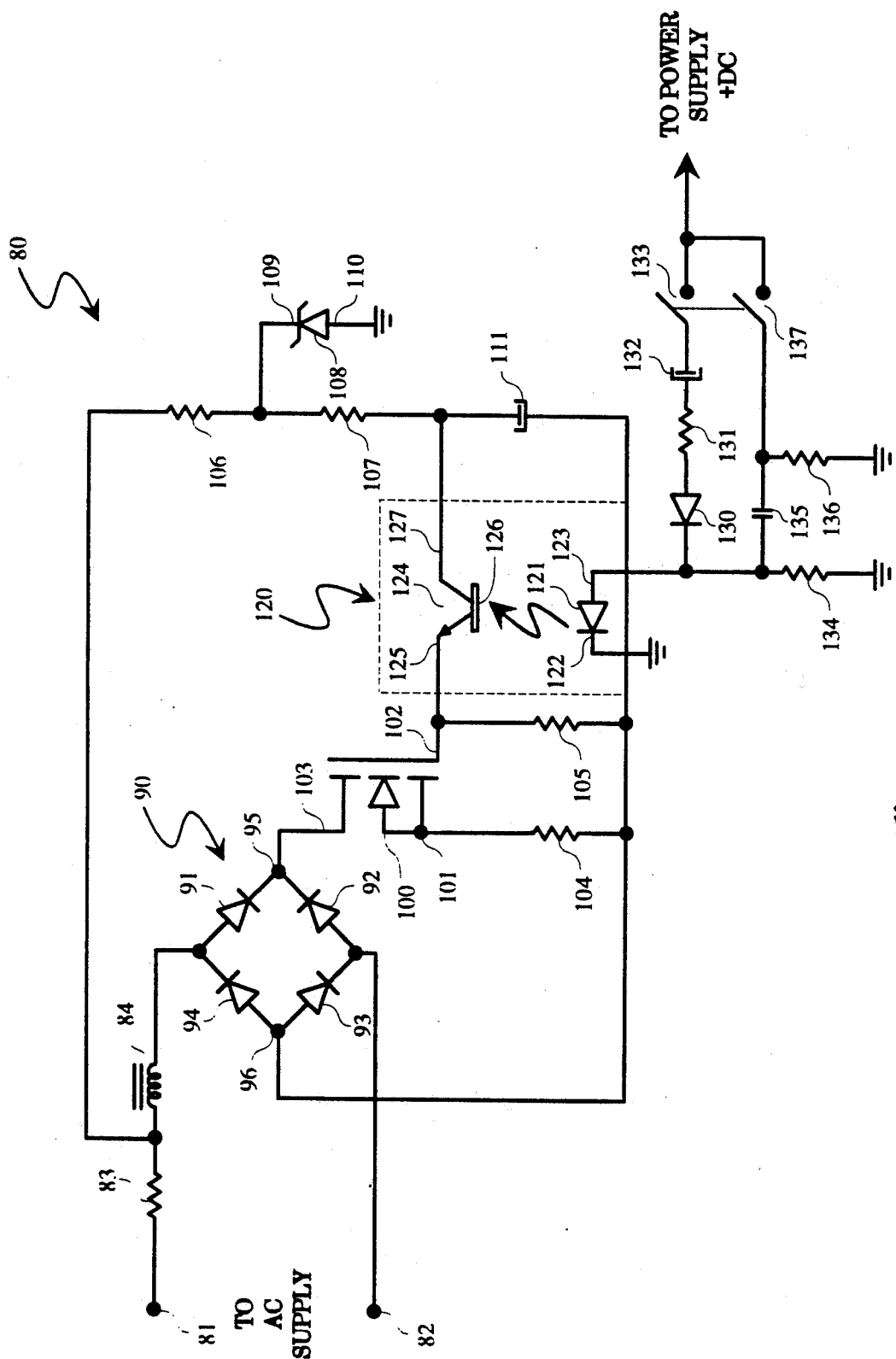
FIG. 2 sets forth a schematic diagram of an alternate embodiment of the present invention fast reset degaussing system.

FIG. 2 sets forth an alternate embodiment of the present invention degaussing system generally referenced by numeral 80. Circuit 80 includes pair of connections 81 and 82 coupled to the high and low sides respectively of a conventional alternating current power source (not shown). A resistor 83 couples power coupling 81 to a degaussing coil 84. Degaussing coil 84 is constructed in accordance with conventional fabrication techniques. A conventional bridge rectifier 90 is formed by a quartet of diodes 91, 92, 93 and 94. Bridge 90 defines a positive output 95 and a negative output node 96. A field effect transistor 100 includes a source electrode 101 coupled to node 96 by a resistor 104, a gate electrode 102 coupled to node 96 by a resistor 105 and a drain electrode 103 coupled to positive node 95. A zener diode 108 includes a cathode 109 coupled to the junction of resistor 83 and degaussing coil 84 by a resistor 106 and an anode 110 coupled to ground. A resistor 107 and capacitor 111 are coupled in series between cathode 109 of zener diode 108 and negative node 96 of bridge rectifier 90.

An optical coupler 120 includes a phototransistor 124 having an emitter 125 coupled to gate electrode 102 of field effect transistor 100, a photosensitive base 126, and a collector 127 coupled to the junction of resistor 107 and capacitor 111. Optical coupler 120 further includes a light emitting diode 121 having a cathode 122 coupled to ground and an anode 123.

A capacitor 132 is coupled to a power supply (not shown) by a switch 133 and to a resistor 131. Resistor 131 is coupled to anode 123 of light emitting diode 121 by a diode 130. A resistor 134 couples anode 123 of light emitting diode 121 to ground. The junction of resistor 134 and anode 123 is coupled to a power supply (not shown) by the series combination of a capacitor 135 and a switch 137. The junction of capacitor 135 and switch 137 is coupled to ground by a resistor 136. Switches 133 and 137 are commonly operative in combination with on/off switch of the host receiver or monitor of circuit 80 and are normally open when the host receiver is off and are closed when the host receiver or monitor is turned on.

In operation with the host receiver or monitor of circuit 80 initially assumed to be turned off, switches 133 and 137 are open as shown in FIG. 2. With switches 133 and 137 open, capacitor 135 is discharged and capacitor 132 is separated from its power supply coupling. As a result, light emitting diode 121 is not energized and thus no light output is produced by light emitting diode 121 within optical coupler 120. Correspondingly, in the absence of light energy coupled to photosensitive base 126 of phototransistor 124, transistor 124 remains nonconductive. With transistor 124 nonconductive, the voltage at gate electrode 102 of field effect transistor 100 corresponds generally to the voltage of node 96 of bridge rectifier 90. As a result, field effect transistor 100 is nonconductive and no load is imposed upon bridge circuit 90. With bridge circuit 90 unloaded, the applied alternating current power at inputs 81 and 82 produce little, if any, alternating current within degaussing coil 84. The combination of resistor 106 and zener diode 108 rectifies a small portion of the applied alternating current signal at power coupling 81 to produce a rectified DC voltage corresponding to the zener voltage of diode 108. This rectified voltage is coupled to capacitor 111 by resistor 107 causing capacitor 111 to become charged to the zener diode voltage of diode 108.

Once the host receiver or monitor is turned on, switches 133 and 137 are closed coupling capacitors 132 and 135 to a positive power supply (not shown). The coupling of capacitor 135 to operating supply causes capacitor 135 to become charged producing a voltage across resistor 134. As capacitor 135 becomes charged, the voltage across resistor 134 decays exponentially in accordance with the time constant of capacitor 135 and resistor 134. Initially, the relatively high voltage developed across resistor 134 produces a sufficient positive voltage at the cathode of diode 130 to maintain diode 130 in a nonconductive state until the voltage across resistor 134 decays sufficiently to allow diode 130 to conduct. Concurrently, the positive voltage across resistor 134 produced by the charging of capacitor 135 causes light emitting diode 121 to conduct producing a light output which energizes base 126 of phototransistor 124 causing transistor 124 to become conductive.

The conduction of phototransistor 124 discharges capacitor 111 through resistor 105 producing a positive voltage at gate 102 of field effect transistor 100. The resulting conduction of field effect transistor 100 imposes a significant load upon bridge rectifier circuit 90 which in turn causes an alternating current to flow within degaussing coil 84.

Figure 3:
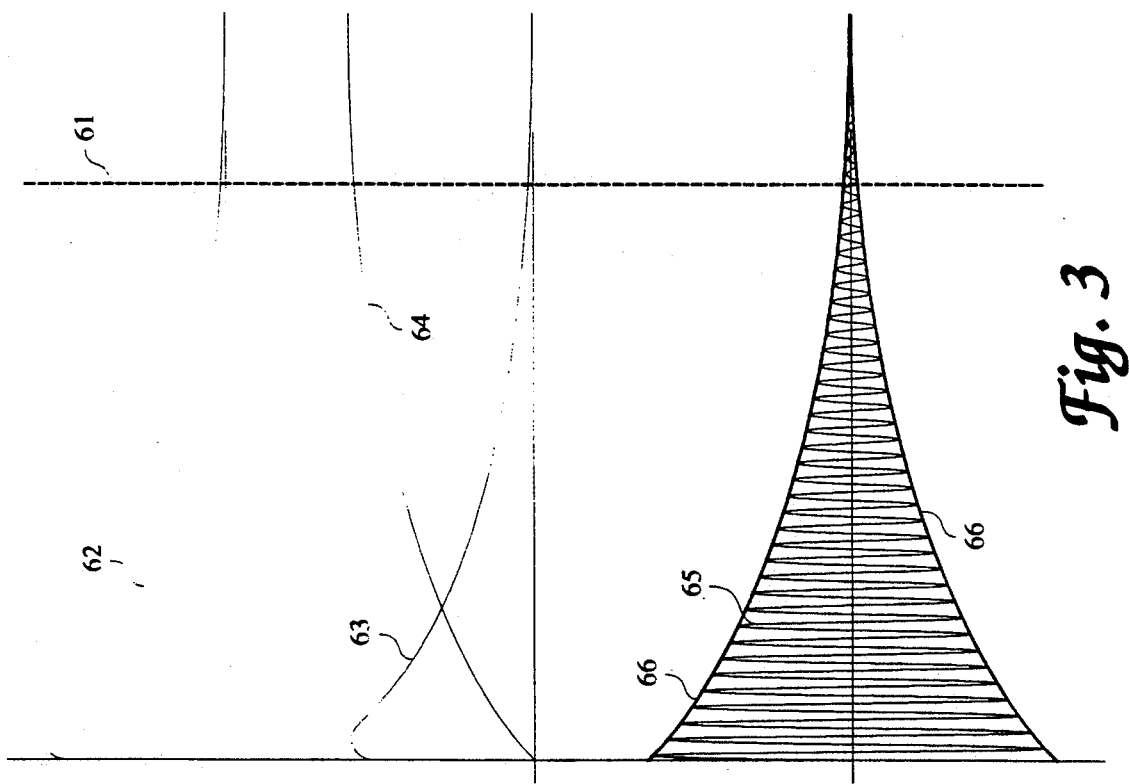
FIG. 3 sets forth a plurality of signal waveforms illustrative of the operation of the present invention fast reset degaussing system.

The voltage produced across resistor 134 by the charging of capacitor 135 corresponds to wave form 62 in FIG. 3 and decays exponentially as capacitor 135 becomes charged. Correspondingly, the energizing level of light emitting diode 121, in essence, follows the applied voltage at anode 123 and as a result produces an exponentially decaying light output. Because phototransistor 124 responds to the light energy applied to photosensitive base 126, the exponentially decaying light output of light emitting diode 121 causes the conduction of phototransistor 124 to diminish in accordance with the exponential decay of the received light energy. As a result, the voltage at gate 102 of field effect transistor 100 also undergoes the exponential decay corresponding to wave form 62 in FIG. 3. The resulting current as the voltage at gate 102 decays of field effect transistor 100 corresponds to curve 63 of FIG. 3. As a result, the decrease of drain current within field effect transistor 100 causes a correspondingly reduced load upon bridge rectifier circuit 90 and a corresponding reduction in the alternating current carried by degaussing coil 84. Wave form 65 in FIG. 3 sets forth the exponentially decaying alternating current within degaussing coil 84. The decay of current within degaussing coil 84 continues until capacitor 13 becomes completely charged (shown by dashed line 61 in FIG. 1) afterwhich little or no current flows through degaussing coil 84.

The use of optical coupler 120 and the charging circuits of capacitors 132 and 13 operates to protect field effect transistor 100 by providing a time delay relative to field effect transistor operation and power supply characteristics of the host receiver or monitor.

With general reference to FIGS. 1 and 2, it should be noted that the use of substantial negative feedback within field effect transistors 40 and 100 of circuits 10 and 80 respectively provided by source resistors 46 and 104 respectively permits the systems of FIGS. 1 and 2 to be relatively insensitive to the voltage of AC power applied. Thus, both the circuit of FIG. 1 and the circuit of FIG. 2 may be operated using either one hundred and ten volt or two hundred and twenty volt AC power without substantial differences in the degaussing action.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a cathode ray tube display powered from a source of alternating current power and an on/off switch, a degaussing system comprising:

a degaussing coil having a first end coupled to said source of alternating current power and a second end;

a rectifier circuit coupled to said second end and said source of alternating power and having a rectified voltage output;

signal means for producing a control signal having a maximum initial amplitude followed by a time decay portion thereafter which decreases from said maximum amplitude to a near zero amplitude;

a variable current element coupled to said rectified voltage output, said variable current element having a current controlling input coupled to said signal means; and switch means coupled to said on/off switch for operating said signal means each time said on/off switch transitions from off to on.

2. A degaussing system as set forth in claim 1 wherein said variable current element includes an amplifier having an output terminal coupled to said rectified voltage output, a common terminal, and an input terminal coupled to said signal means.

3. A degaussing system as set forth in claim 2 wherein said amplifier includes a field effect transistor and wherein said output, common and input terminals are the drain, source and gate electrodes respectively of said field effect transistor.

4. A degaussing system as set forth in claim 1 wherein said signal means includes a resistive-capacitive network coupled to said switch means.

5. A degaussing system as set forth in claim 4 wherein said resistive-capacitive network is discharged each time said switch means operate.

6. A degaussing system as set forth in claim 4 wherein said resistive-capacitive network is charged each time said switch means operate.

7. A degaussing system as set forth in claim 3 wherein said switch means include delay means for delaying the application of said control signal to said gate electrode of said field effect transistor for a predetermined interval.

8. A degaussing system as set forth in claim 7 wherein said switch means include an optical coupler having a primary current path within said resistive capacitive network and an input, and wherein said delay means includes a charging capacitor and resistor coupled to said input of said optical coupler.

9. A degaussing system as set forth in claim 2 wherein said amplifier includes negative feedback means for permitting said degaussing system to compensate for voltage changes of said source of alternating current power.

10. A degaussing system as set forth in claim 9 wherein said negative feedback means includes a resistive element coupling said common terminal to a source of ground potential.

11. A degaussing system as set forth in claim 10 wherein said amplifier includes a field effect transistor and wherein said output, common and input terminals are the drain, source and gate electrodes respectively of said field effect transistor.

* * * * *